United States Patent [19]

Johnson

[11] Patent Number: 5,664,065
[45] Date of Patent: Sep. 2, 1997

[54] PULSE-COUPLED AUTOMATIC OBJECT RECOGNITION SYSTEM DEDICATORY CLAUSE

[75] Inventor: John L. Johnson, Huntsville, Ala.

[73] Assignee: The United States of America as represented by the Secretary of the Army, Washington, D.C.

[21] Appl. No.: 668,029

[22] Filed: Jun. 17, 1996

[51] Int. Cl.$^6$ .................................................. G06F 15/00
[52] U.S. Cl. .................. 395/21; 395/20; 395/22; 395/25
[58] Field of Search .................. 382/158, 159; 359/558, 576, 559; 395/22, 24, 21, 27, 20

[56] References Cited

U.S. PATENT DOCUMENTS

| | | | |
|---|---|---|---|
| 4,961,615 | 10/1990 | Owechko et al. | 359/11 |
| 5,167,007 | 11/1992 | Toyoda | 395/25 |
| 5,289,304 | 2/1994 | Phuvan | 359/140 |
| 5,497,253 | 3/1996 | Stoll et al. | 359/29 |

OTHER PUBLICATIONS

Johnson et al. "Observation of Periodic Waves in a pulse-coupled neural network," Optics Letters, vol. 18, No. 15, pp. 1253–1255 Aug. 1, 1993.

Johnson, "Pulse-coupled neural nets: translation, rotation, scale, distortion, and intensity signal invariance for images," Applied Optics, vol. 33, No. 26, pp. 6239–6253 Sep. 10, 1994.

"Feature Linking via Synchronization among Distributed Assemblies: Simulations of Results from Cat Visual Cortex," by R. Eckhorn, H. J. Reitboeck, M. Arndt and P. Dicke, *Neural Computation* 2, pp. 293–307 (1990).

*Primary Examiner*—Tariq R. Hafiz
*Assistant Examiner*—Ji-Yong D. Chung
*Attorney, Agent, or Firm*—Hugh P. Nicholson; Freddie M. Bush; Hay Kyung Chang

[57] ABSTRACT

The pulse-coupled automatic recognition system processes information utilizing parallel neural network and transmits information to and from the processing sites as time signals which encode in their pulse phase structure the geometrical content of the spatial distributions of light. A locating device then measures the coordinates of the spatial distributions (pulsating segment) and displays the coordinates of the pulsating segment on a screen for observation. The pulsating segment indicates the presence and location of the component of the input scene that corresponds to the segment.

18 Claims, 3 Drawing Sheets

PULSE-COUPLED AUTOMATIC OBJECT RECOGNITION SYSTEM DEDICATORY CLAUSE

The invention described herein may be manufactured, used and licensed by or for the Government for governmental purposes without the payment to me of any royalties thereon.

BACKGROUND OF THE INVENTION

Prior art in computers consists of analog and digital processors. The analog devices implement algebra and calculus functions for the purpose of solving systems of equations while digital devices implement arithmetical and logical statements in a serial fashion and do not use parallel processing.

The pulse-coupled neural network (PCNN), derived from the Eckhorn mathematical linking field model (see "Feature Linking via Synchronization among Distributed Assemblies: Simulations of Results from Cat Visual Cortex," by R. Eckhorn, H. J. Reitboeck, M. Arndt and P. Dicke, *Neural Computation* 2, pp. 293–307 (1990)), is a higher order neural network which uses pulses and pulse coupling to form linking waves and time signals. It presents a general method of combining information, transmitting information to and from processing sites as time signals. The time signals encode in their pulse phase structure the geometrical content of the input spatial distributions and other feature information. It combines, or fuses, the information from separate sources by multiplying their time signals to form a composite time signal. The PCNN allows time-synchronous pulse activity as well as parallel processing through neural network algorithms. It contains both sums and products that can be combined to make logical rules for information fusion.

The pulse-coupled neural network model neuron has three parts: (1) a pulse generator (2) a linking mechanism and (3) receptive field structures. The network itself, as distinguished from the individual neuron, is composed of many such neurons all interconnected with each other and further connected to external signal sources and external systems. With reference to FIG. 1 which is a diagram of a model neuron, each part of the neuron is explained below in detail. In FIG. 1, as in the other figures, like numbers represent like parts and arrows denote the direction of signal travel.

(1) The Pulse Generator:

As shown, pulse generator 101 consists of threshold discriminator 103 followed by pulse former 105. The discriminator is triggered when an input signal $U_j$, called the internal activity, exceeds the value of the threshold signal $\theta_j$ at some point in time. When such an event occurs, the discriminator sends a signal to the pulse former causing the latter to produce spike-like pulse trains. These pulses are produced at a fixed rate and are all identical. The pulse former output is the neuron's output, $Y_j$, which feeds to other neurons and which also feeds back to threshold element 107. The threshold element is a leaky integrator, modeled by a first-order relaxation or exponential decay process. It is recharged by the pulses produced by the pulse former until it is driven above the level of the internal activity at which time the pulse generator stops making pulses.

(2) The Linking Mechanism:

Linking mechanism 117 allows an input signal, called the modulating linking input $1+\beta_j L_j$, to modulate the standard input, called the feeding input $F_j$, to pulse generator 101. The modulating linking input is produced by adding, at summing junction 113, a bias offset to $L_j$ which is derived from spatial and/or temporal groups of pulses from other neurons and algebraically multiplying the result at multiplier 111 by the feeding input $F_j$ that comes from a standard video camera. The resulting product $U_j$ is then used as the modified input to the pulse generator. The modulating linking input which travels by channel 109 is preprocessed prior to the biasing and multiplication that happen at summing junction 113 and multiplier 111, respectively.

(3) Receptive Field Structures:

The aforementioned pre-processing is done by receptive field structures 115 of the model neuron. The temporal preprocessing usually consists of convolving the input pulses Y(Kl) through Y(Kn) from other neurons (first to nth neurons) with exponential decay time kernels 119 through 121. These are first-order relaxation processes and are identical to that used in threshold element 107 except that the characteristic decay time of time kernels 119 through 121 is shorter than that of threshold element 107. Subsequent spatial pre-processing consists of forming a weighted sum, at summing junction 113 (which also adds the linking strength β), of pulses over a given spatial region. This weighted sum is the linking input $\beta_j L_j$.

As illustrated in FIG. 1, the receptive field structures consist of means for receiving the pulses from other model neurons and a source of video image and combining them into appropriate input signals for the linking mechanism. Each model neuron can have many receptive fields, both feeding and linking, and the several receptive fields can each receive a pulse from the same transmitting neuron at the same time. The receptive field structures receive many inputs and generates only one output, $U_j$. A receptive field can have a single or multiple connection points each of which is available for connection with one input pulse signal. A multiplicative weight (not illustrated) can be applied to the amplitude of the input pulse and the value of the weight can be different for every connection point. The connection point can further have a first-order relaxation process which acts on the weighted input pulse and produces an exponentially-weighted time average. All of the first-order relaxation processes can have different and distinct decay time constants and all of the receptive field connection points can have different time decay constants. Following the connection point weighting and the first-order decay processes, the signals are linearly summed at summing junction 113 and biased to become modulating linking input, $1+\beta_j L_j$.

SUMMARY OF THE INVENTION

Electro-optical pulse-coupled neural networks generate pulse patterns from optical images of cluttered input scenes. The pulse-coupled automatic object recognition system utilizes the pulse patterns to detect and recognize pre-selected objects in such cluttered environments. Time signals that are produced from these pulse patterns are characteristic of the various components of the input scene. The time signals that correspond to pre-selected objects are used selectively to open a time gate thereby transmitting light only when the pre-selected objects are present in the scene.

DESCRIPTION OF THE PREFERRED EMBODIMENT

Figure 2:
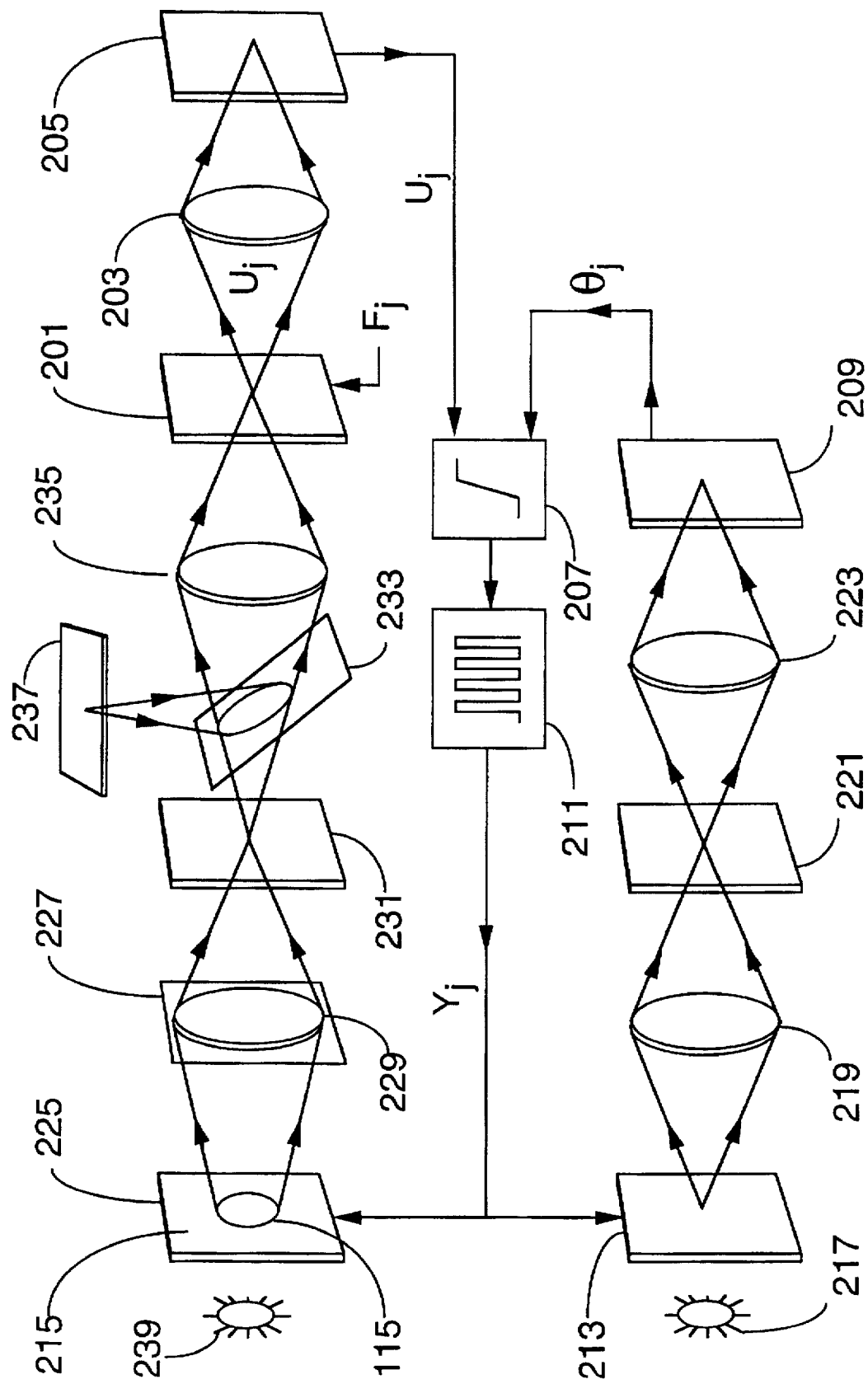
FIG. 2 shows a new electro-optical implementation of the neuron based on the principles of Eckhorn as explained above.

Referring now to FIG. 2, the structure and operation of the electro-optical implementation and augmentation of the neuron based on the Eckhorn model is explained in detail.

Feeding optical input $F_j$ originating from a standard video camera (not shown here) is input to first spatial light modulator (SLM) 201 and when linking optical input $\beta_j L_j$ (from a source to be detailed later) passes through SLM 201, it multiplies with $F_j$, thereby producing $U_j$. $U_j$ is then transmitted to be incident on reimaging lens 203 which, in turn, focusses the image onto first detector array 205. The first detector array, which may be a CCD array, converts the optical image of $U_j$ into corresponding electronic video signal and inputs this electronic $U_j$ to step function element 207 which performs the functions of the discriminator in the Eckhorn model neuron. If the electronic $U_j$ exceeds the value of the threshold signal $\theta_j$ that is input to the step function element from second detector array 209, then the step function element goes from "0" to "1". This action causes pulse former 211 which is coupled to the step function element to produce at least one pulse. However, usually multiple pulses are produced by the pulse former in spike-like pulse trains, one pulse per frame time. These pulses, thusly generated by the pulse former, are the pulse pattern output, $Y_j$, of the jth neuron. $Y_j$ is then simultaneously fed into second SLM 213 and a set 215 of other neurons surrounding or in the vicinity of the jth neuron.

The processing of $Y_j$ that goes to second SLM 213 is discussed first: While the pulse pattern $Y_j$ is visible on the second SLM, a light from first suitable source 217 is shone through the SLM, thereby reimaging $Y_j$ onto phosphercoated glass plate 221 via re-imaging lens 219. Upon receiving a lit-up pulse, the phosphor-coated glass plate brightens then subsequently undergoes a slow decay. When $Y_j$ is a pulse train, what emerges from glass plate 221 is a pattern of pulses, all decaying in a staggered fashion. These decaying pulses are re-imaged by third re-imaging lens 223 onto second detector array 209, the video data stream into which is perfectly synchronized with the data stream from first detector array 205 to step function element 207. The second detector array, which may be a television camera, reads the decaying pulses and sends corresponding electronic video signals, $\theta_j$, to the step function element. $\theta_j$, received by the step function element from second detector array 209, is subtracted from $U_j$ received from first detector array 205. If the result is "0" or negative, then nothing occurs at the step function element. However, if the subtraction yields a positive result (i.e. $U_j > \theta_j$), then the step function element goes from "0" to "1" at that instant and pulse former 211, that is coupled to the step function element, produces at least one pulse output $Y_j$. The step function element is brought back down to "0" when the pulses produced by the pulse former while the step function element remains in "1" is enough to result in a new $\theta_j$ that is greater than $U_j$. In such a case, the subtraction of $\theta_j$ from $U_j$ would result in a negative sum thereby bringing the step function element from "1" to "0".

Figure 1:
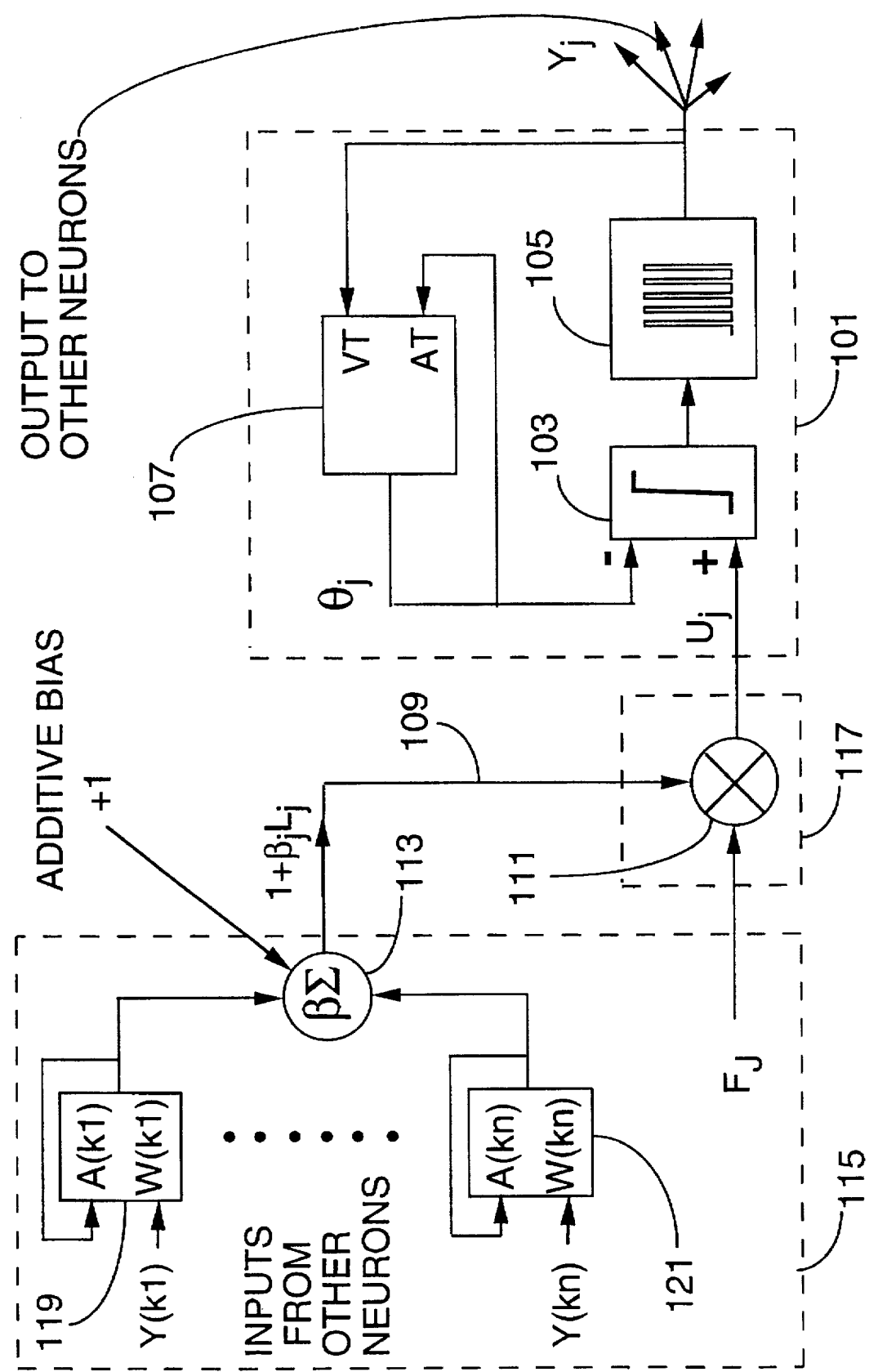
FIG. 1 is a diagram of a model neuron.

As stated earlier, $Y_j$ is also fed into other neurons (pixels) 215 which surround or are in the vicinity of the jth neuron, all of which neurons being the pixels of third SLM 225. When receptive field structures 115 of a given sub-set of neurons receive $Y_j$, light from second suitable source 239 is incident on SLM 225 and transforms $Y_j$ into an optical image which is then imaged onto first summing lens 229. The first summing lens is located between second phosphercoated glass plate 231 which itself is located at the re-imaging plane and third SLM 225 and is further positioned such that the focal point of the first summing lens determines the size and location of such sub-set of neurons on SLM 225. The first summing lens may be set at the focal plane or deliberately set out-of-focus. If it is set out-of-focus, then each point of the image $Y_j$ on second glass plate 231 receives contribution from several points of the image on the other neurons 215 of third SLM 225. A multiplier mask 227 that may be positioned anywhere between third SLM 225 and second glass plate 231 multiplies the optical image of $Y_j$ emerging from the third SLM with linking strength factor, $\beta$. If the mask is set arbitrarily out-of-focus, then each point of the mask will multiply by its particular value the several points of the image on the other neurons 215. Thus the mask's transmissivity at each point gives some type of weights. However, for the special case where the mask is located at the aperture of first summing lens 229, the mask will give the identically weighted receptive field for all the points in the image field of the lens. From second glass plate 231, the resultant image which is the weighted sum out of the receptive field structures (as depicted in FIG. 1) travels to beamsplitter 233 that provides a bias offset by guiding into the optical system a beam of a given constantintensity from third suitable light source 237. The biased image, now referred to as $1+\beta_j L_j$, is then re-imaged by second summing lens 235 onto first SLM 201 where it multiplies with feeding optical input $F_j$ to result in modied input $U_j$. Thereafter, $U_j$ is processed as described above.

In the electro-optical implementation of the pulse-coupled neuron as illustrated in FIG. 2, the source of optical feeding input $F_j$ and third light source 237 for providing the bias are always on, independently of the other elements of the neural network. The neural network is self-contained and the pulse pattern Y, the combined output of neurons 215, that is imaged onto third SLM 225 is the final output of the pulse-coupled neural network (PCNN).

Figure 3:
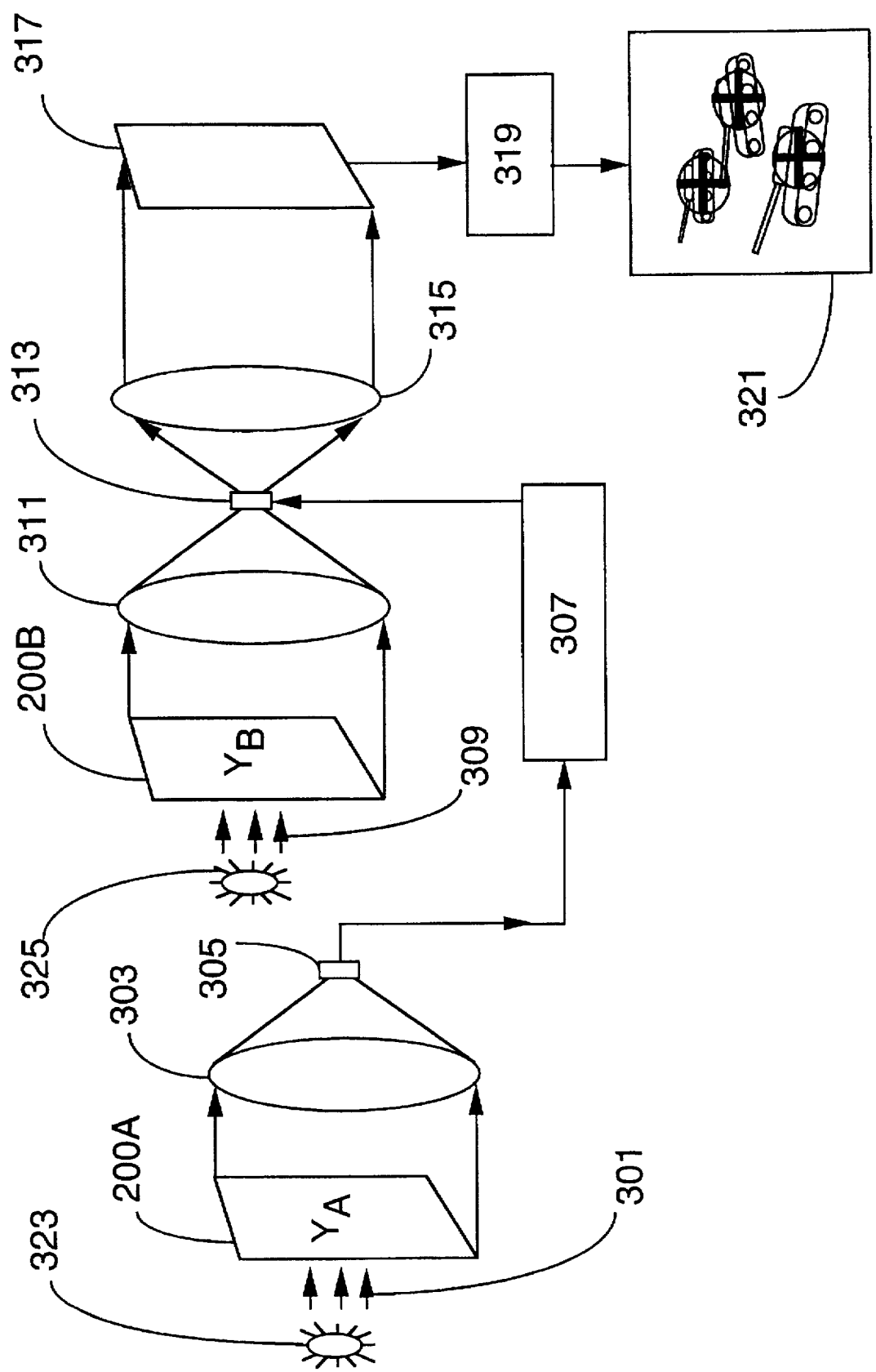
FIG. 3 illustrates a preferred embodiment of the automatic object recognition system utilizing the electro-optical implementation of the neuron as depicted in FIG. 2 above.

This final output Y of the PCNN can be used in a system for automatic recognition of selected objects in a cluttered environment. FIG. 3 shows a diagram of the preferred embodiment of such a system.

The pulse pattern $Y_A$ on PCNN 200A modulates collimated light beam 301 passing therethrough from first light panel 323. The resulting optical image of $Y_A$ impinges on first focussing lens 303 which focusses the image to a point on single-pixel detector 305 which, in turn, produces electronic output signals in response to the focussed input image. These electronic output signals are the reference time signals of the various components of pulse pattern $Y_A$ and are coupled into time correlator 307 that is suitable for recording and storing the reference time signals and is further capable of transmitting to time gate 313 the time signals that correspond to pre-selected components of the entire pulse pattern $Y_A$.

Contemporaneously with the production of the time signals, another collimated beam of light 309 from second light panel 325 impinges on PCNN 200B and is modulated by pulse pattern $Y_B$ before being incident on second focussing lens 311. It is noted here that $Y_A$ and $Y_B$ are identical to each other and PCNN's 200A and 200B have the identical number and geometrical arrangement of pixels. Upon incidence of the image of $Y_B$, the second focussing lens, then, focusses the image onto time gate 313 which opens and closes in phase with the time signal input thereto from time correlator 307, thereby selectively transmitting the focussed light onto collimating lens 315. Such a time gate can be single-pixel optical spatial light modulators. The collimating lens, then, re-collimates the light and transmits it to impinge on video image detector array 317, such as a CCD array, that has the identical number and geometrical arrangement of pixels as do the first and second PCNN's. The output of detector array 317 is further input to centroid locator 319 which measures the coordinates oft he light distribution on the detector array and displays the information on screen 321. Since time gate 313 opens only in response to the reference time signal input from time correlator 307 and the input reference time signals are those of a pre-selected component of the pulse pattern Y (corresponding to a pre-selected object in the original scene that is represented by the pulse pattern), the output light distribution on detector array 317 is primarily that of the pre-selected object image. Therefore, the coordinates produced by centroid locator 319 correspond to and are indicative of the location of that pre-selected object in the original scene and the displayed location of the pre-selected object bears the same relation to the screen as does the object itself to the entire scene.

Although a particular embodiment and form of this invention has been illustrated, it is apparent that various modifications and embodiments of the invention may be made by those skilled in the art without departing from the scope and spirit oft he foregoing disclosure. Accordingly, the scope of the invention should be limited only by the claims appended hereto.

I claim:

1. A pulse-coupled automatic object recognition system for detecting and recognizing pre-selected objects in a scene, said system comprising: a first and a second pulse-coupled neural networks (PCNN's), said PCNN's being capable of producing corresponding electronic pulse patterns in response to optical inputs thereto, said optical inputs being descriptive of the scene; a means for producing reference time signals, said time signals being characteristic of the portions of the scene that correspond to said time signals; a means for detecting light; a gating means simultaneously coupled between said second PCNN, said light-detecting means and said time signal-producing means for selectively allowing, in response to time signal inputs from said signal-producing means, the transmission of light from said second PCNN onto said light-detecting means, said transmitted light being indicative of the pre-selected object and a measuring means coupled to said light-detecting means to measure the coordinates of light distribution on said light-detecting means, thereby yielding the positional information of the pre-selected object in the input scene.

2. A pulse-coupled automatic object recognition system as set forth in claim 1, wherein said first and second PCNN's have the identical number and geometrical arrangement of pixels.

3. A pulse-coupled automatic object recognition system as set forth in claim 2, wherein said system further comprises a means to illuminate the pulse patterns on said first and second PCNN's, thereby producing optical images of said pulse patterns.

4. An automatic object recognition system as set forth in claim 3, wherein said means for producing reference time signals comprises a single-pixel detector capable of generating time signals in response to optical inputs thereto; a first focussing lens positioned to receive the optical image of the electronic pulse patterns from said first PCNN and focus the image onto said single-pixel detector; and a time correlator, said correlator being coupled to said single-pixel detector to receive therefrom and store the time signals, said correlator further transmitting pre-selected time signals.

5. An automatic object recognition system as set forth in claim 4, wherein said light-detecting means is a charge-coupled device (CCD) array.

6. An automatic object recognition system as set forth in claim 5, wherein said gating means comprises a second focussing lens positioned to receive from said second PCNN the optical image of the electronic pulse patterns; a collimating lens for collimating incident light and transmitting the light to impinge on said CCD array; and a time gate, said gate being coupled to said time correlator and being further positioned between said second focussing lens and collimating lens selectively to open, in response to time signal inputs from said time correlator, thereby selectively allowing the passage of focussed light from said second focussing lens onto said collimating lens.

7. An object recognition system as set forth in claim 6, wherein said measuring means is a centroid locator.

8. An object recognition system as set forth in claim 7, wherein said system still further comprises a means for displaying, said displaying means being coupled to said centroid locator for receiving from said locator the positional information of the pre-selected object and displaying the information for visual observation.

9. An object recognition system as set forth in claim 8, wherein said first, second PCNN's and said CCD array all have the identical number and geometrical arrangement of pixels.

10. A pulse-coupled automatic object recognition system for locating and recognizing pre-selected objects in a scene, said system comprising:

a first and a second pulse-coupled neural networks (PCNN's), said PCNN's being capable of generating corresponding electronic pulse patterns in response to optical inputs thereto, said optical inputs being descriptive of the scene and said pulse patterns modulating any beam of light passing therethrough; a single-pixel detector for producing time signals in response to input images focussed thereonto; a first focussing lens positioned between said first PCNN and said detector to receive the modulated light emanating from said first PCNN and focus said modulated light to be incident on said detector; a time correlator coupled to said single-pixel detector for receiving therefrom the time signals, said time correlator being capable of further transmitting pre-selected time signals that correspond to pre-selected objects in the scene; a second focussing lens positioned to receive and focus the modulated light emanating from said second PCNN; a collimating lens; a time gate located between said second focussing lens and collimating lens to receive the focussed modulated light from said second focussing lens and transmit the focussed light to be incident on said collimating lens, said lime gate being further coupled to said time correlator to receive therefrom pre-selected time signals and opening selectively in response to the pre-selected time signals; a detector array for detecting the collimated light incident thereon from said collimating lens; and a centroid locator coupled to measure the coordinates of the light distribution on said detector array to provide the locational information of the pre-selected objects in the scene.

11. A pulse-coupled automatic object recognition system as set forth in claim 10, wherein each of said first and second PCNN's is illuminated by its own light source.

12. An automatic object recognition system as set forth in claim 11, wherein said system further comprises a screen connected to said centroid locator for receiving the object locational information from said locator and displaying the position of the object on said screen.

13. An automatic object recognition system as set forth in claim 12, wherein said display of the pre-selected object image has equivalent position with respect to the entire screen as does the object with respect to the entire input scene.

14. An object recognition system as set forth in claim 13, wherein said first, second PCNN's and said detector array all have the identical number and geometrical arrangement of pixels.

15. An electro-optical pulse-coupled neural network (PCNN) having a plurality of pixels, said PCNN comprising: a first spatial light modulator (SLM) for receiving and modulating input light passing therethrough; a first detector array for detecting light incident thereon and producing electronic video signals in response to the light; a first re-imaging lens positioned linearly between said first SLM and said first detector array for receiving the modulated light from said first SLM and focussing the light to be incident on said first detector array; a second detector array; a threshold discriminator coupled between said first detector array and said second detector array to produce a causal signal in response to the inputs from said first and second detector arrays; a pulse former coupled to said discriminator to generate at least one output pulse in response to said causal signal; a threshold means coupled to receive said output pulse and produce therefrom a threshold signal, said threshold means comprising a first phosphor-coated glass plate; a second SLM coupled to receive said output pulse from said pulse former; a first illuminator positioned to illuminate said second SLM; a second re-imaging lens located to focus the image of said output pulse from said second SLM onto said first phosphor-coated glass plate, said first plate exhibiting phosphor decay in response to the focussed image of said output pulse; and a third re-imaging lens positioned to focus the decaying image onto said second detector array, said second detector array producing the threshold signal in response to said decaying image, said threshold means further transmitting said threshold signal to said discriminator; and a means for summing the output pulses of several of the pixels to produce a linking input suitable for inputting to said first SLM.

16. An electro-optical PCNN as described in claim 15, wherein said summing means comprises a third SLM coupled to receive said output pulse from said pulse former; a second illuminator suitable for illuminating said third SLM; a second phosphor-coated glass plate capable of undergoing phosphor decay in response to image focussed thereon; a first summing lens coupled between said third SLM and said second glass plate to perform summation of the output pulses of a pre-selected set of several pixels of said third SLM and focus the sum onto said second glass plate to cause the phosphor decay thereon; a second summing lens; a bias positioned between said second glass plate and said second summing lens to add a pre-determined bias to said decaying image, said second summing lens focussing said biased image onto said first SLM.

17. An electro-optical PCNN as described in claim 16, wherein said summing means further comprises an intensity mask, said mask movably positioned between said third SLM and said second glass plate to manipulate the size of said pre-selected set of several pixels.

18. An electro-optical PCNN as described in claim 17, wherein said bias comprises a beamsplitter located between said second glass plate and said second summing lens and a source of constant-intensity light, said source being suitably positioned to illuminate said beamsplitter.

* * * * *